UNITED STATES PATENT OFFICE.

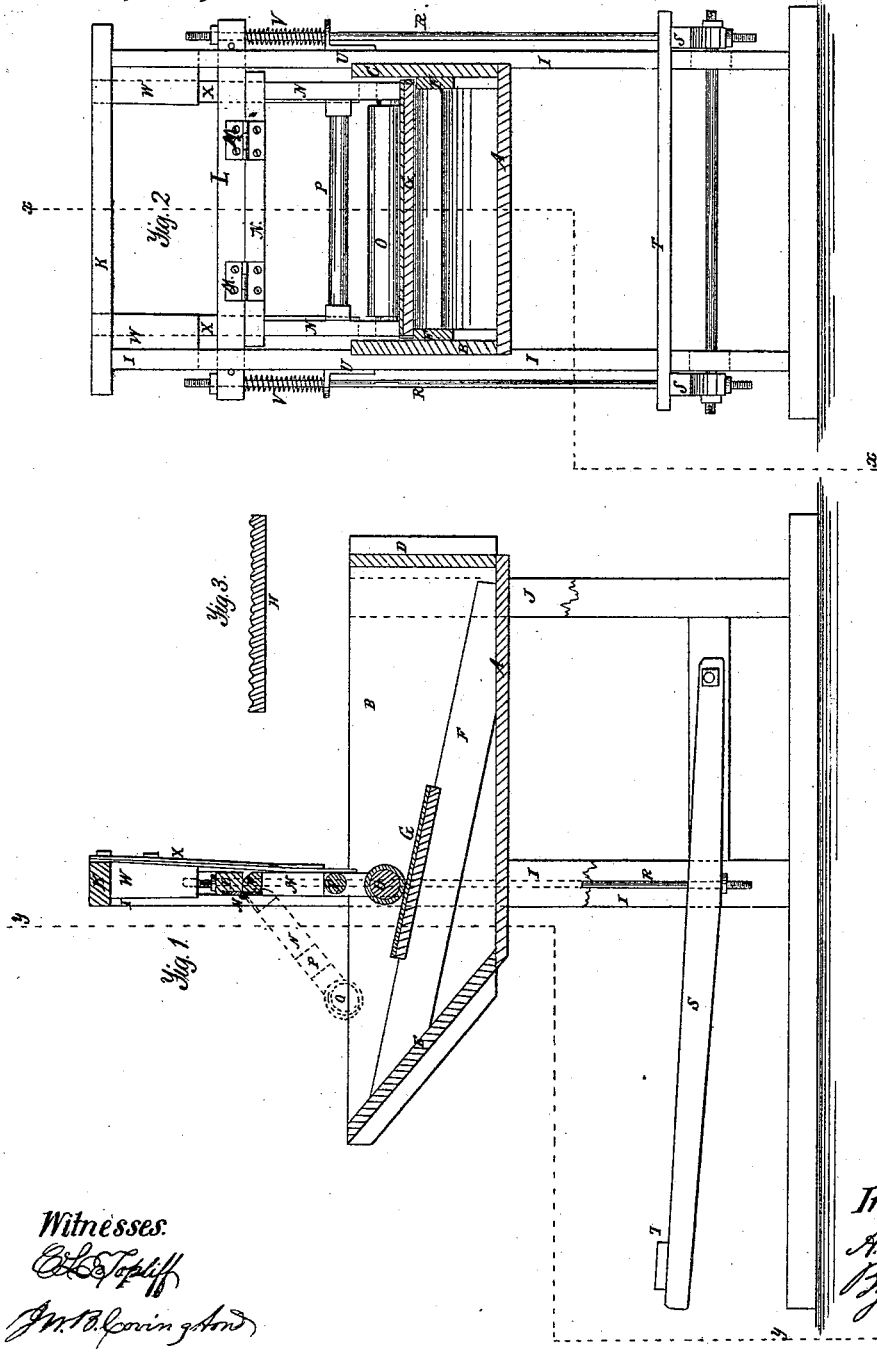

ALEXANDER MITCHELL, OF FREDERICTON, NEW BRUNSWICK.

WASHING-MACHINE.

Specification forming part of Letters Patent No. 52,185, dated January 23, 1866.

*To all whom it may concern:*

Be it known that I, ALEXANDER MITCHELL, of Fredericton, in the county of York and Province of New Brunswick, have invented a new and Improved Washing-Machine; and I do hereby declare that the following is a full, clear, and exact description thereof, which will enable others skilled in the art to make and use the same, reference being had to the accompanying drawings, forming part of this specification, in which—

Figure 1 is a side view, partly in section, through the line $x\,x$, Fig. 2, and showing in red lines the roller and its supporting-frame raised. Fig. 2 is an end view, partly in section, through the line $y\,y$, Fig. 1. Fig. 3 is a cross-section of a fluted wash-board.

The object of my invention is to furnish a washing-machine so constructed and arranged that the force applied to the garments to be washed may be regulated at will to correspond to the delicacy of the fabric; and it consists in the combination of a roller covered with india-rubber or its equivalent with the hinged frame in which it is hung, with an inclined wash-board, and with springs and treadle for operating the same, as hereinafter more fully described.

A is the bottom, B and C are the sides, D is the rear end, and E the front end, of the box which contains the water, and in which the washing is done. The sides B and C and the rear end, D, may be made perpendicular to the bottom A of the box; but the front end, E, should be made inclined, as represented, for the sake of convenience in operating the machine.

F are two slats or side pieces attached to the sides B and C of the box, in an inclined position, as represented, to sustain the movable wash-board G. The said side pieces, F, are notched or grooved on their upper edges to receive the ends of the wash-board G, the notches being equal in length to the breadth of the said wash-board.

The wash-board G may be a plain board, or it may be grooved or fluted, or it may be covered with india-rubber or its equivalent, according to the quality of the articles to be washed; or a set of wash-boards of different descriptions may be furnished, to be changed as required.

H, Fig. 3, represents a cross-section of a grooved or fluted wash-board for washing coarser articles.

I J is the frame of the machine, the two front posts, I, of which extend above the machine, as represented, and are connected at the top by the cross-piece K.

L is a beam or cross-piece working in slots in the posts I. To this beam L is hung, by the hinges M, the frame N. The edges of the cross-pieces L and N are beveled, as represented in Fig. 1, so that the frame N may swing back beyond a perpendicular position to allow the roller to be longer in contact with the wash-board G.

To the lower ends of the perpendicular arms of the frame N is attached the roller O, which roller is covered with india-rubber or its equivalent, and revolves in contact with the wash-board G as the frame N is operated, as hereinafter described.

P is a cross-piece extending between the vertical arms of the frame N, and is designed to serve as a handle in operating the roller O.

To the ends of the cross-piece L extending beyond the posts I of the frame of the machine, as shown in Fig. 2, are two rods, R, one on each side of the machine, and connected with the levers S of the treadle T.

U are knees attached to the posts I, which serve as guides to the rods R, and at the same time support the springs V, which are spiral springs resting upon the knees U and supporting upon their upper ends the cross-bar L and its attachments. W are blocks attached to the frame I K, and to which are attached springs X, the lower ends of which springs X press against the vertical arms of the frame N.

Operation: Water being put into the box until the wash-board G is partially covered, by raising the frame N into the position shown in red lines in Fig. 1 by passing the hand between the roller O and the wash-board G the article to be washed can be arranged upon the wash-board; then, by pushing the frame N back over the edge of the board G, and by pressing with the foot upon the treadle T, the roller O is forced down along the inclined surface of the said wash-board, pressing the water out of the articles, which carries with it the dissolved dirt from the cloth, the springs X at the same time pressing the roller firmly against the wash-board G. When the pressure is removed from the treadle T the springs V raise the beam L, and with it the roller O. The springs X, instead of forcing the roller against the inclined surface of the wash-board G, now force the roller forward, and by raising it a little with the hand by grasping the cross-piece P the articles being washed can be shifted, or when necessary again immersed in the water. By again pressing upon the treadle T the roller again descends, and so on until the washing is completed.

I claim as new and desire to secure by Letters Patent—

A washing-machine formed by combining the roller O, covered with india-rubber or its equivalent, with the inclined wash-board G, the frame N, the cross-piece L, the springs X and V, the rods R, and the treadle T, substantially as described, and for the purpose set forth.

The above specification of my invention signed by me.

ALEXANDER MITCHELL.

Witnesses:
 CHAS. C. GREGORY,
 THOS. BARKER.